(12) United States Patent
Higgs

(10) Patent No.: US 10,904,067 B1
(45) Date of Patent: Jan. 26, 2021

(54) VERIFYING INMATE PRESENCE DURING A FACILITY TRANSACTION

(71) Applicant: Securus Technologies, Inc., Dallas, TX (US)

(72) Inventor: Joseph Higgs, Fort Worth, TX (US)

(73) Assignee: Securus Technologies, LLC, Carrollton, TX (US)

( * ) Notice: Subject to any disclaimer, the term of this patent is extended or adjusted under 35 U.S.C. 154(b) by 531 days.

(21) Appl. No.: 13/858,183

(22) Filed: Apr. 8, 2013

(51) Int. Cl.
*H04L 29/06* (2006.01)
*G06F 3/041* (2006.01)
*G06K 9/00* (2006.01)

(52) U.S. Cl.
CPC ...... *H04L 29/06197* (2013.01); *G06F 3/0412* (2013.01); *G06K 9/00221* (2013.01)

(58) Field of Classification Search
CPC .. G06F 21/32; G06F 2201/825; G06F 3/0412; G06F 3/04; H04L 29/06197; G06K 9/00221
USPC .......................... 340/573.1; 455/466; 726/20
See application file for complete search history.

(56) References Cited

U.S. PATENT DOCUMENTS

| | | | | |
|---|---|---|---|---|
| 6,314,407 B1* | 11/2001 | Maeno | ................... | G06Q 20/20 340/286.06 |
| 6,665,805 B1* | 12/2003 | Tsirkel | ................... | G06F 1/3203 713/310 |
| 8,417,268 B1* | 4/2013 | Halferty et al. | .............. | 455/466 |
| 8,604,931 B1* | 12/2013 | Veloso | .............. | H04M 1/72577 340/5.31 |
| 2006/0192775 A1* | 8/2006 | Nicholson | ................. | A61F 4/00 345/211 |
| 2009/0160541 A1* | 6/2009 | Liu | ....................... | G06F 1/3228 327/544 |
| 2009/0175509 A1* | 7/2009 | Gonion | ................. | G06F 1/3231 382/118 |
| 2010/0205667 A1* | 8/2010 | Anderson | ............... | G06F 3/013 726/19 |
| 2010/0240415 A1* | 9/2010 | Kim | .................... | G06F 3/03547 455/565 |
| 2011/0023113 A1* | 1/2011 | Munyon | ................. | G06F 21/32 726/19 |
| 2011/0213618 A1* | 9/2011 | Hodge et al. | .................. | 705/1.1 |
| 2011/0273267 A1* | 11/2011 | Bong | ...................... | G06F 3/016 340/5.53 |
| 2012/0013438 A1* | 1/2012 | Black | .................. | G06F 3/03545 340/5.83 |
| 2012/0169594 A1* | 7/2012 | Zhao | .................... | G09G 3/3406 345/158 |
| 2013/0181948 A1* | 7/2013 | Sakai | .................... | G06F 3/0425 345/175 |

(Continued)

*Primary Examiner* — Lunyi Lao
*Assistant Examiner* — Jarurat Suteerawongsa
(74) *Attorney, Agent, or Firm* — Fogarty LLP

(57) ABSTRACT

Embodiments of the invention are directed to methods, apparatuses, and systems for verifying inmate presence during a secure facility transaction. In one embodiment, a method may include receiving input information to initiate a user session at an interactive data terminal, generating user presence information to track the presence of the user at the interactive data terminal, determining that the user has left the interactive data terminal in response to the presence information, and automatically terminating the user session in response to a determination that the user has left the interactive data terminal.

25 Claims, 7 Drawing Sheets

(56) References Cited

U.S. PATENT DOCUMENTS

| | | | |
|---|---|---|---|
| 2013/0194238 A1* | 8/2013 | Sakai | H04N 21/4314 345/175 |
| 2013/0232568 A1* | 9/2013 | Nunami | G06F 21/32 726/17 |
| 2013/0293456 A1* | 11/2013 | Son | G06F 3/013 345/156 |
| 2013/0311807 A1* | 11/2013 | Woo | G06F 1/3234 713/323 |
| 2013/0315419 A1* | 11/2013 | Chien | H03G 7/00 381/98 |

* cited by examiner

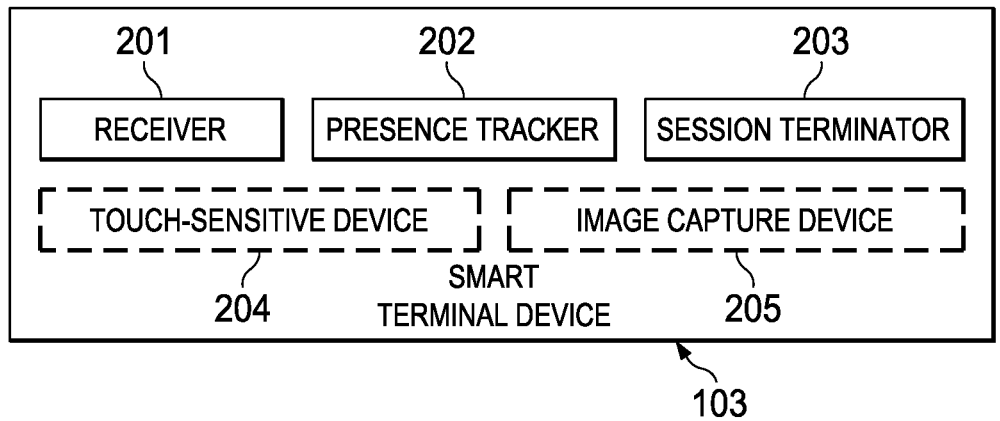
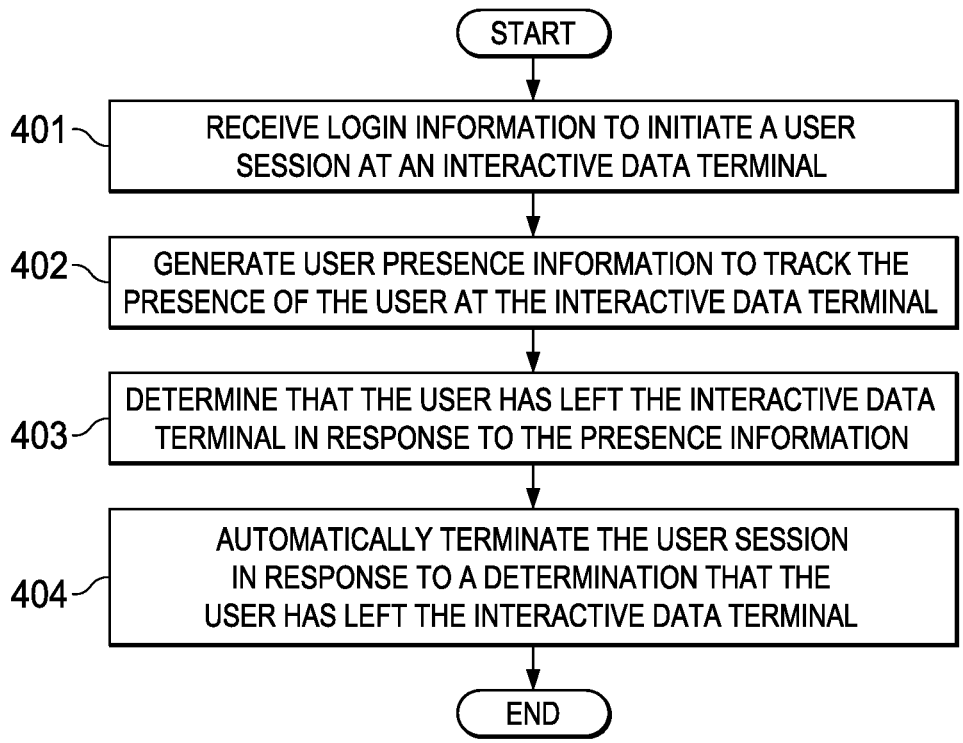

VERIFYING INMATE PRESENCE DURING A FACILITY TRANSACTION

TECHNICAL FIELD

Embodiments of the invention are directed, in general, to interactive computing devices and, more specifically, to methods and systems for verifying inmate presence during a facility transaction.

BACKGROUND

Correctional facilities have recently started granting access to "smart terminals" through which inmates may access services including not only telephone service but also other services and information. Accordingly, such facilities may allow inmates to log into an "inmate portal" or other network-based system that is secured and limited only to access within the facility or within facility-designated limits. Smart terminals are a shared resource, and therefore security is a primary concern. If an inmate logs in but then walks away without logging out, then their account information and potentially their money or account credits could be jeopardized.

Although correctional facilities have had issues with inmates stealing or sharing Personal Identification Numbers (PINS) for phone access, there has never been an "inmate portal" that retained a particular access session as active. That is, inmates have historically simply hung up the phone to terminate the use of their PIN to place a call. If the same inmate wants to place another call, they are required to hang up and start a new session.

With the addition of an inmate portal, there may no longer be an opportunity to "hang up" and therefore inmates will need to log in and log out. Certain functionalities will follow the "phone model" of requiring an inmate to "login" for each session (e.g., phone call, video visitation, etc) but others are expected to allow the inmate to have prolonged, interactive sessions (e.g., use of legal libraries, reading/sending emails, etc). Generically speaking, such logins might be protected by either a time out timer on the login—if there is no activity for a set period of time, the login session is automatically closed-, or requiring redundant logins whenever accessing certain details or spending money or account credits.

There are various drawbacks to these methods. For example, the time out timer creates a need to have constant "activity" and therefore does not lend itself towards situations when the inmate is reading large blocks of text on the screen, or viewing/listening to something that does not require them to input anything. Furthermore, it presents a time window during which another inmate can still "jump in" and continue an existing login session.

Similarly, requiring redundant logins has drawbacks. Although this tactic is useful, it does not prevent potentially sensitive/private information currently on the screen from being seen by others once the logged-in inmate walks away without logging out.

SUMMARY

Embodiments of the invention are directed to methods, apparatuses, and systems for verifying inmate presence during a secure facility transaction. In one embodiment, a method may include receiving input information to initiate a user session at an interactive data terminal, generating user presence information to track the presence of the user at the interactive data terminal, determining that the user has left the interactive data terminal in response to the presence information, and automatically terminating the user session in response to a determination that the user has left the interactive data terminal.

In one embodiment, generating the user presence information may include designating an area of a touch-sensitive device for the user to continuously contact, sensing the user initiating contact with the area, and sensing the user terminating contact with the area. Designating the area of the touch-sensitive device may include generating a graphic on a touch-screen device for designating the area of the touch screen for the user to contact. The area of a touch-sensitive device may include an entire screen of a touch-screen device in one embodiment.

In one embodiment, generating the user presence information includes capturing an image including one or more facial features, determining that the image includes the one or more facial features, and detecting that the one or more facial features have been removed from the image. In one embodiment, the input information comprises login credentials.

The method may also include generating a warning the user, in response to a determination that the user has left the interactive data terminal, that the session will automatically terminate unless the user responds to the warning.

An apparatus for verifying inmate presence during a secure facility transaction is also described. In one embodiment, the apparatus includes a processing device configured to receive input information to initiate a user session at an interactive data terminal, generate user presence information to track the presence of the user at the interactive data terminal, determine that the user has left the interactive data terminal in response to the presence information, and automatically terminate the user session in response to a determination that the user has left the interactive data terminal.

A tangible computer program product comprising computer readable instructions that, when executed by a processing device, cause the processing device to perform operations for verifying inmate presence during a secure facility transaction is also described. In one embodiment, the operations include receiving input information to initiate a user session at an interactive data terminal, generating user presence information to track the presence of the user at the interactive data terminal, determining that the user has left the interactive data terminal in response to the presence information, and automatically terminating the user session in response to a determination that the user has left the interactive data terminal.

A system for verifying inmate presence during a secure facility transaction is described. In one embodiment, the system includes a touch-screen device, an image capture device configured to capture an image including one or more facial features, and a processing device coupled to the touch-screen device and to the image capture device. The processing device may be configured to receive input information from the touch-screen device to initiate a user session at an interactive data terminal, generate user presence information to track the presence of the user at the interactive data terminal, determine that the user has left the interactive data terminal in response to the presence information, and automatically terminate the user session in response to a determination that the user has left the interactive data terminal.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, a system may include at least one processor and memory coupled to the at least one processor, the memory configured to store program instructions executable by the at least one processor to cause the system to execute one or more operations disclosed herein.

BRIEF DESCRIPTION OF THE DRAWINGS

Figure 1:
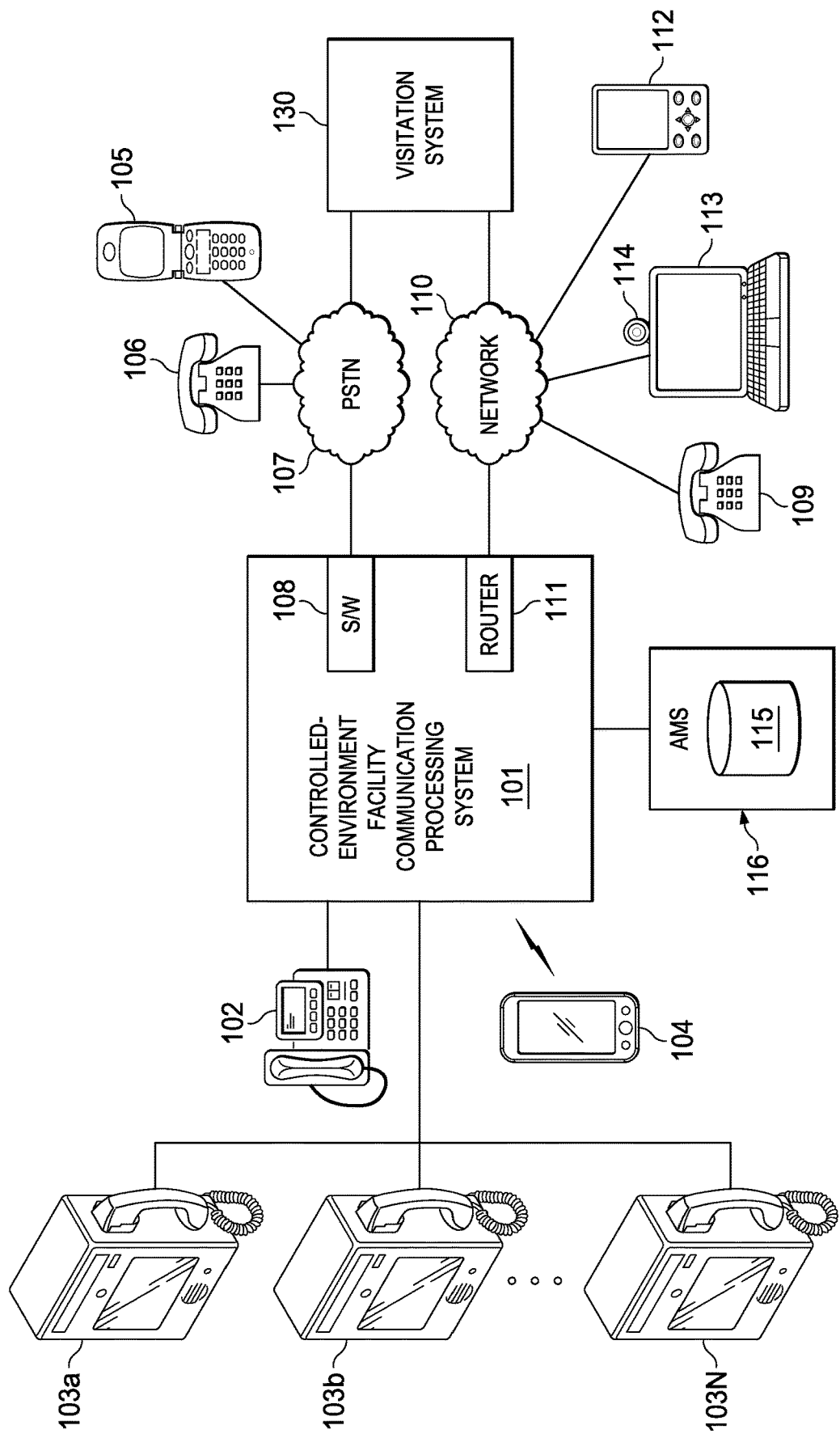

Having thus described the invention in general terms, reference will now be made to the accompanying drawings, which are not necessarily drawn to scale, and wherein:

FIG. 1 is a schematic block diagram illustrating one embodiment of a system for verifying inmate presence during a facility transaction.

FIG. 2 is a schematic block diagram illustrating one embodiment of an apparatus for verifying inmate presence during a facility transaction.

Figure 3:
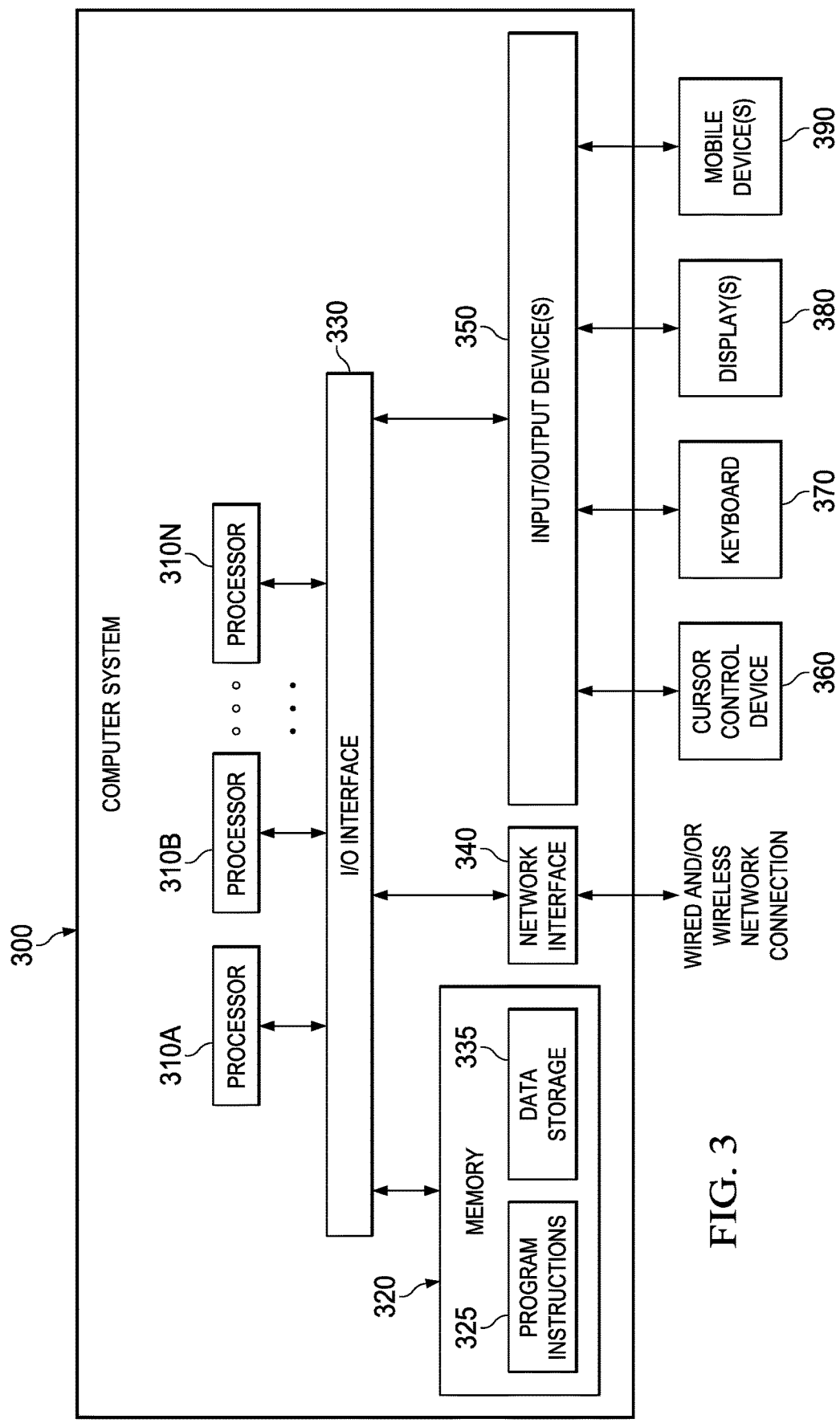

FIG. 3 is a schematic block diagram illustrating one embodiment of a processing device configurable for use according to the present embodiments.

FIG. 4 is a schematic flowchart diagram illustrating one embodiment of a method for verifying inmate presence during a facility transaction.

Figure 5:
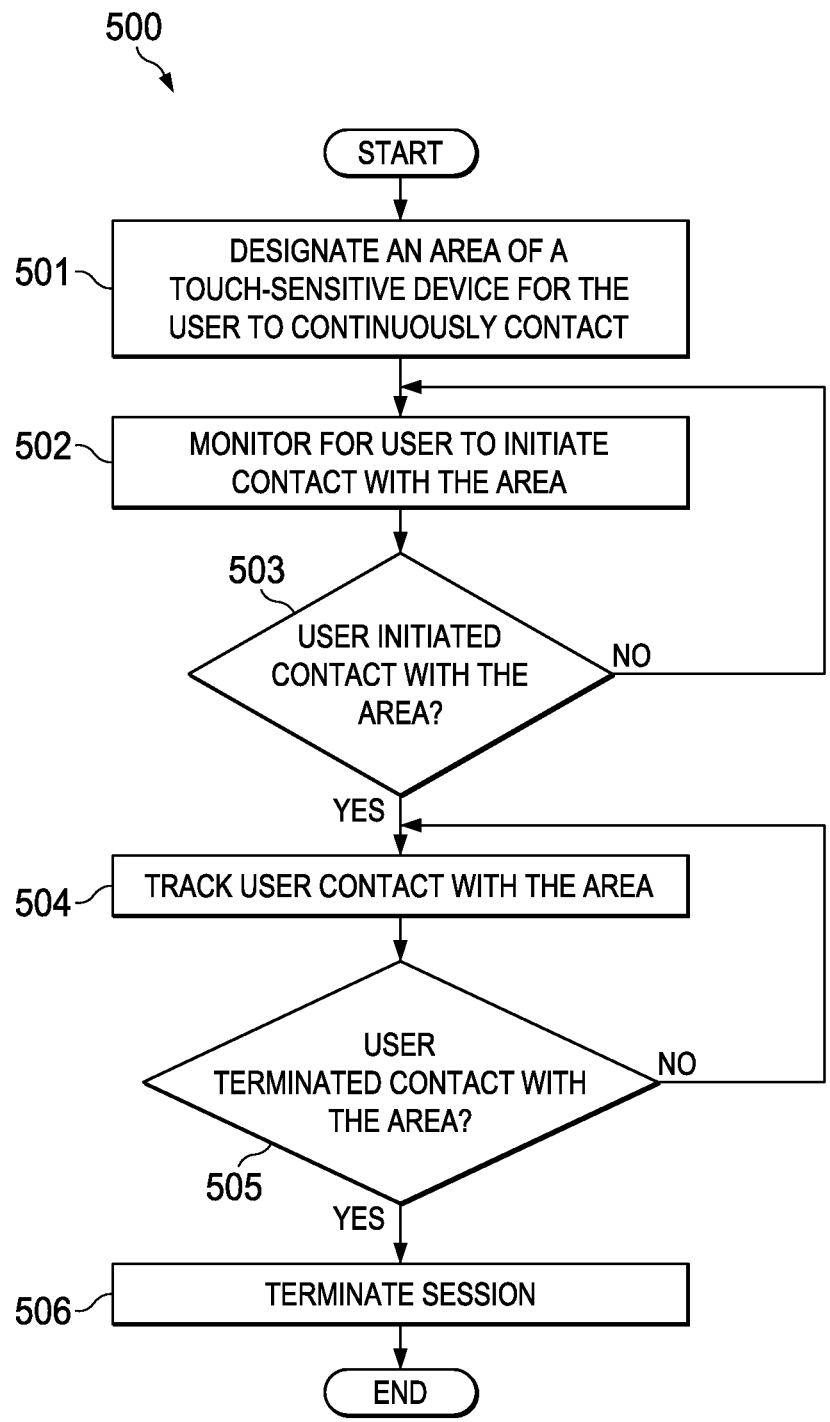

FIG. 5 is a schematic flowchart diagram illustrating another embodiment of a method for verifying inmate presence during a facility transaction.

Figure 6:
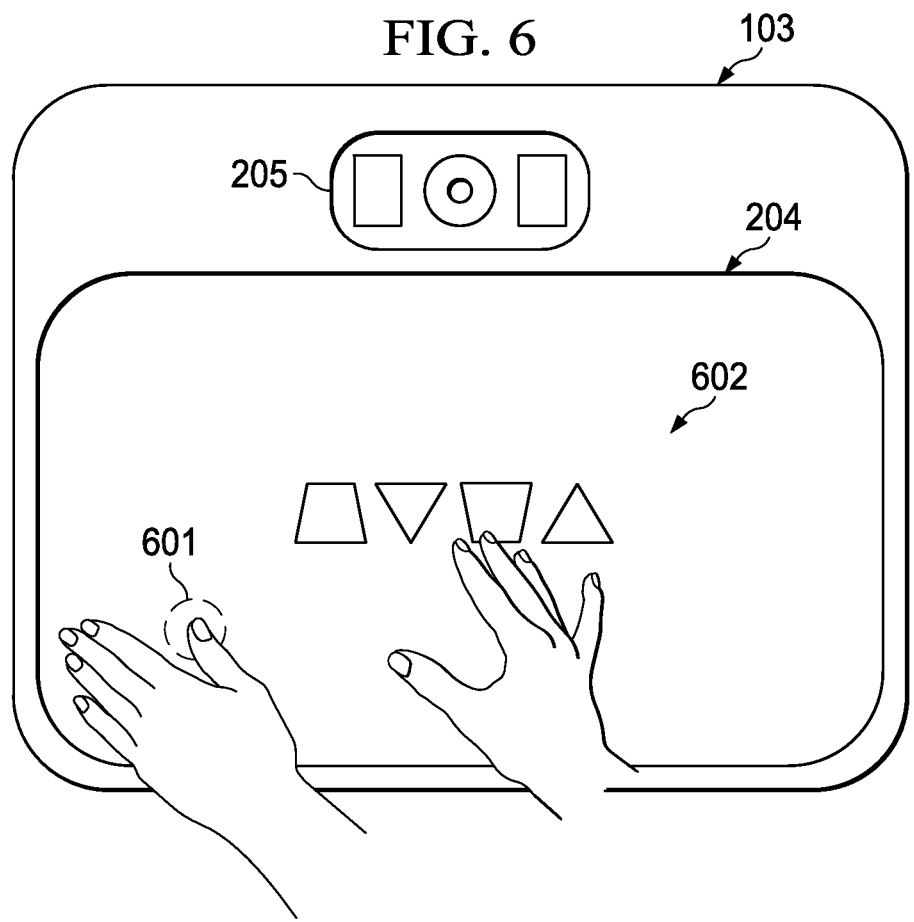

FIG. 6 is a mockup diagram illustrating one embodiment of an apparatus for verifying inmate presence during a facility transaction during use.

Figure 7:
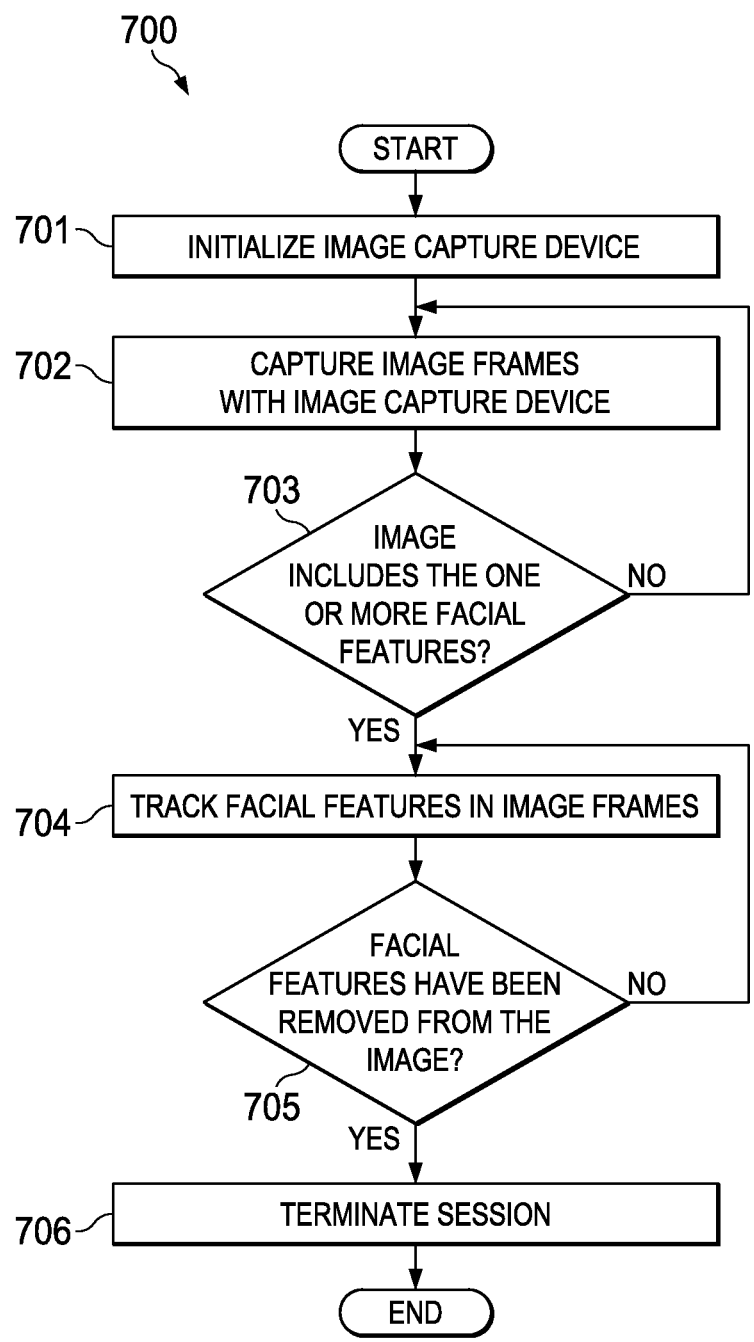

FIG. 7 is a schematic flowchart diagram illustrating another embodiment of a method for verifying inmate presence during a facility transaction.

Figure 8:
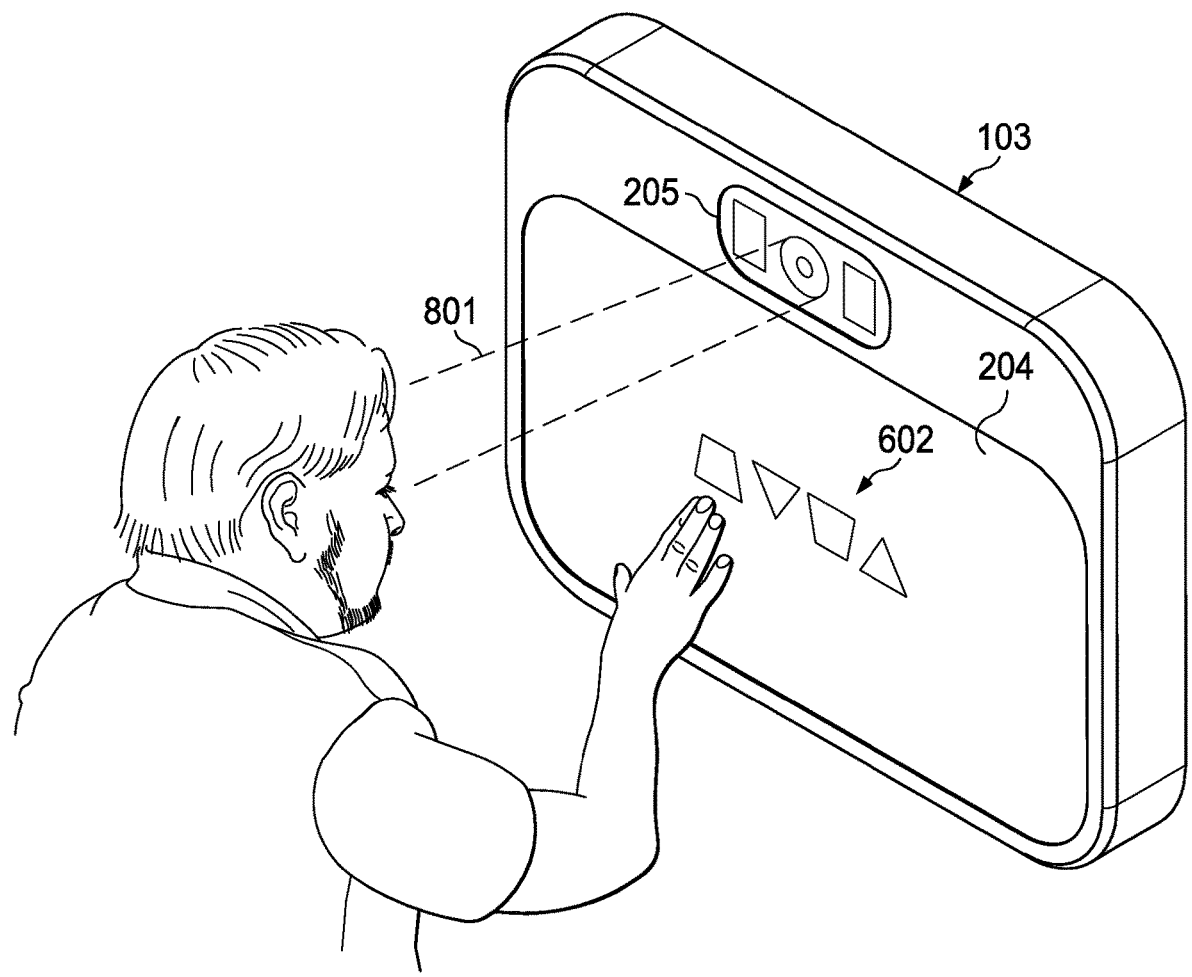

FIG. 8 is a mockup diagram illustrating another embodiment of an apparatus for verifying inmate presence during a facility transaction during use.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

This specification discloses methods and systems for verifying inmate presence during a facility transaction. Generally speaking, the various techniques described herein may find applicability in a wide variety of controlled-environment facilities (as well as outside of controlled-environment facilities). Examples of controlled-environment facilities may include correctional institutions or facilities (e.g., municipal jails, county jails, state prisons, federal prisons, military stockades, juvenile facilities, detention camps, home incarceration environments, etc.), healthcare facilities (e.g., hospitals, nursing homes, mental health facilities, rehabilitation clinics, such as drug and alcohol rehabilitation facilities, etc.), restricted living quarters (e.g., hotels, resorts, camps, dormitories, barracks, etc.), and the like.

For convenience of explanation, various examples discussed herein are presented in the context of correctional facilities. For instance, in some of the embodiments discussed below, a controlled-environment facility may be referred to as a jail or prison, and its residents may be referred to as residents, arrestees, detainees, or inmates. It should be understood, however, that the systems and methods described herein may be similarly applicable to other types of controlled-environment facilities and their respective residents (e.g., a hospital and its patients). Other embodiments may be suitable for use in other public places, for example at ATM devices or at airport check-in kiosks.

Turning now to FIG. 1, a block diagram of an illustrative environment where verifying inmate presence during facility transactions may be employed is depicted according to some embodiments. As shown, communication processing system 101 may provide telephone services, videoconferencing, online chat, and other communication services to a controlled-environment facility. For example, in some cases, communication system 101 may be co-located with a controlled-environment facility. Alternatively, communication system 101 may be centrally or remotely located with respect to one or more controlled-environment facilities and/or may provide communication services to multiple controlled-environment facilities. More generally, however, it should be noted that communication system 101 may assume a variety of forms, and may be configured to serve a variety of facilities and/or users, whether within or outside of a controlled-environment facility.

In the context of a correctional facility, for instance, inmates may use telephones 102 to access certain communication services. In some facilities, inmates may also use a personal computer wireless device 104 to access such services. For example, an inmate may initiate telephone services by lifting the receiver on telephone 102, at which time the inmate may be prompted to provide a personal identification number (PIN), other identifying information or biometrics. An interactive voice response (IVR) unit (not shown) may generate and play prompt or other messages to inmates on devices 102 and/or 104.

Under the control of communication processing system 101, devices 102 and 104 may be capable of connecting to a non-resident's (i.e., a person not committed to a controlled-environment facility) device 105 or telephone 106 across a publicly switched telephone network (PSTN) 107. For example, device 105 may be a mobile phone, whereas telephone 106 may be located at a non-resident's home, inmate visitation center, etc. Switch 108 in communication processing system 101 may be used to connect calls across PSTN 107. Additionally or alternatively, the non-resident may be at telephone 109 or device 112, which is on Voice-over-IP (VoIP), or packet data network 110, such as, for example the Internet. Router 111 of communication system 101 is used to route data packets associated with a call connection to destination telephone 109 or device 112.

Smart terminals 103a-n (each collectively referred to as "smart terminal 103") may have video conferencing capabilities to enable inmates to participate in video visitation sessions with non-residents of the correctional facility via video call, secure online chat, etc. In one embodiment, smart terminals 103 may include touch-screen devices. In some embodiments, smart terminals 103 may include an image capture device, such as a webcam. For example, a non-resident party may have a personal or laptop computer 113 with camera 114 (or a cell phone, tablet computer, etc.). Additionally or alternatively, device 112 may have an integrated camera and touch-screen display (e.g., a smart phone, tablet, etc.). A network connection between the parties may be established and supported by an organization or commercial service that provides computer services and software for use in telecommunications and/or VOIP, such as SKYPE®. Additionally or alternatively, the correctional facility and/or the destination may use videoconferencing equipment compatible with ITU H.323, H.320, H.264, and/or V.80, or other suitable standards. Generally speaking, each smart terminal 103 may be disposed in a visitation room, in a pod, kiosk, etc.

In addition to providing certain visitation and communication operations, communication processing system 101 may attempt to ensure that an inmate's calls, video conferences, online chats, etc. are performed only with non-residents whose identities, devices, email addresses, phone numbers, etc. are listed in that inmate's Pre-Approved Contact (PAC) list. Each inmate's PAC list may be stored, for example, in database 115 maintained by Administration and Management System (AMS) 116. In addition to PAC list(s), AMS 116 may also store inmate or resident profile data (RPD), as well as inmate financial data, such as commissary accounts.

As an example, in the context of a correctional facility, database 115 may include information such as balances for inmate trust and calling accounts; trial schedule; conviction data; criminal record; sentencing data, such as time served, time remaining to be served, and release date; cell and cellmate assignments; inmate restrictions and warnings; commissary order history; telephone call history; call recordings; known or suspected gang or criminal affiliations; known or suspected affiliates, accomplices, or gang members; and any other information that may be relevant or useful to correctional facility staff to house and maintain inmates.

Visitation system 130 may be configured to provide, schedule, and manage visitation services to residents and non-residents of a controlled-environment facility. To that end, visitation system 130 may be coupled to PSTN 107 and/or network 110 in a manner similar to communication processing system 101 by also including one or more gateways, switches and/or routers (not shown). Accordingly, visitation system 130 may be configured to communicate with one or more residents of the controlled-environment facility via devices 102-104 and with one or more non-residents via devices 105, 106, 109, 112, and/or 113. Although visitation system 130 is shown in FIG. 1 as being remotely located with respect to communication processing system 101 and the controlled-environment facility, in other cases visitation system 130 may be co-located with the facility and/or integrated within system 101.

In some implementations, communication system 101 may be configured to perform video visitation monitoring operations configured to monitor and or record video visitations (e.g., as electronic video files). In scenarios where communication system 101 is located within the controlled-environment facility, it may have direct access to AMS 116. In other embodiments, however, communication system 101 may be located remotely with respect to the controlled-environment facility, and access to AMS 116 may be obtained via a computer network such as, for example, network 110.

In some embodiments, smart terminals 103 may be implemented as a computer-based system. For example, each of smart terminals 103 may include a display, camera, and handset. The display may be any suitable electronic display such as, for example, a Liquid Crystal Display (LCD), a touchscreen display (e.g., resistive, capacitive, etc.), or the like, whereas the camera may be a suitable imaging device such as, for instance, a video camera or webcam equipped with Charge-Coupled Devices (CCDs), Complementary Metal-Oxide-Semiconductor (CMOS) active pixel sensors, etc. A handset may be similar to a traditional telephone handset including an earpiece portion (with a loudspeaker), a handle portion, and a mouthpiece portion (with a microphone).

During a video visitation session, smart terminals 103 may be configured to capture a video image of an inmate to be transmitted to a non-resident using the camera, and to display a video image of the non-resident to the inmate using the display. Smart terminals 103 may also be configured to capture an audio signal from the inmate to be transmitted to a non-resident using the mouthpiece portion of the handset, and to provide an audio signal from the non-resident to the inmate using the earpiece portion of the handset. Additionally or alternatively, audio received from the non-resident may be reproduced via a loudspeaker, and audio provided by the inmate may be captured via a microphone.

In addition to video visitation, smart terminals 103 may also be used by the inmate to access an inmate portal which allows access to communication processing system 101. The access available to the inmate through the inmate portal may be limited or restricted according to the inmate's permissions on the system 101. In some embodiments, the inmate may be able to access his/her personal account information, make purchases, check electronic communications such as email, and the like.

In some cases, smart terminals 103 may assume the form of any computer, tablet computer, smart phone, etc., or any other consumer device or appliance with videoconferencing capabilities.

FIG. 2 is a schematic block diagram illustrating one embodiment of an apparatus, such as smart terminal device 103, for verifying inmate presence during a facility transaction. In one embodiment, the apparatus may be configured to perform one or more operations as defined by the modules 201-205 depicted in FIG. 2. In one embodiment, the modules 201-205 may be implemented in hardware. In alternative embodiments, the apparatus may comprise a storage medium and a data processor. The modules 201-205 may be software or firmware modules organized as computer readable code stored on the storage medium and configured to cause the data processor to perform operations described herein. Further embodiments of a computing device 300 configurable to perform the operations described by modules 201-205 is discussed in further detail in FIG. 3.

In one embodiment, the apparatus of FIG. 2 may include a receiver module 201, a presence tracker 202, and a session terminator 203. In addition, the apparatus may include one or both of a touch-sensitive device 204 or an image capture device 205. In one embodiment, one or more of these modules may be configured as a discrete component within the apparatus. Alternatively, one or more of the modules may be co-located, integrated, or combined into a single component, application, function, or process.

The receive module 201 may be configured to receive input information to initiate a user session at an interactive data terminal. For example, the receiver module 201 may be configured to receive a user's login information, a button click, a touch on touch-sensitive device 204, or another indication that a user wishes to initiate a user session. The user session may enable the user to perform any of a variety of tasks, including making telephone or video calls, conducting account transactions, making purchases, checking permissions, checking schedules or electronic communications, and the like. In one embodiment, the user is an resident of a secure facility, such as a prison inmate. The interactive data terminal may be, for example, smart terminals 103. In another embodiment, the interactive data terminal may be a kiosk device, such as a passenger check-in kiosk in an airport or an Automatic Teller Machine (ATM).

The presence tracker 202 may be configured to generate user presence information to track the presence of the user at the interactive data terminal. Additionally, presence tracker 202 may be configured to determine that the user has left the interactive data terminal in response to the presence information. The presence tracker 202 may be configured to receive information from either the touch-sensitive device 204 or the image capture device 205, or both. In certain embodiments, the presence tracker 202 may monitor the inputs from the touch-sensitive device 204 or the image capture device 205 to generate the presence information. In various embodiments, other devices may be used for generating presence data, including infrared (IR) sensors, sonic sensors, sweeping laser sensors, buttons, pressure plates, or the like. One of ordinary skill in the art will recognize a variety of alternative methods that may be used for tracking the presence of a user at the interactive data terminal.

In one embodiment, the session terminator 203 may be configured to automatically terminate the user session in response to a determination that the user has left the interactive data terminal. The session terminator 203 may terminate the session immediately in response to the determination that the user has left the interactive data terminal. Alternatively, the session terminator 203 may include a timer, counter, or clock configured to terminate the session after a predetermined time period from a time at which it is determined that the user has left the interactive data terminal. In such an embodiment, the session terminator 203 may display a message or play an alarm signal indicating that the session is about to be terminated. In a further embodiment, the session terminator 203 may generate a count-down indicator for displaying or otherwise communicating a time at which the session will be terminated.

Touch sensitive device 204 may include, for example, a touchscreen display, a mouse pad, a button or contact-sensitive receiver, or the like. In one embodiment, a specific area of the touch-sensitive device 204 may be designated for generating the user presence information. In still a further embodiment, a graphic may be displayed over the area to indicate the designated are for touching. In still further embodiments, the graphic and associated designated area may be moved or adjusted by the user to meet the demands of the session. For example, the user may be allowed to move the designated area from a lower left portion of the touch sensitive device 204 to an upper right portion by performing a predetermined operation on the touch sensitive device 204, such as a double-tap, or multi-touch slide. In an alternative embodiment, the entire area of the touch-sensitive device 204 may be used.

Image capture device 205 may include, for example, a webcam or other video capture equipment, a still camera configured to capture successive images at a predetermined interval, or the like. Image capture device 205 may capture an image that contains one or more facial features of the user. In one embodiment, presence tracker 202 may be configured to determine that the image includes the one or more facial features and track those facial features within successive images or video frames to ensure that the facial features are continuously present in the images. The presence tracker 202 may further detect that one or more of the facial features have been removed from the image. Such embodiments may be referred to as face detection. In a further embodiment, the image capture device 205 and presence tracker 202 may be further configured to perform facial recognition operations, thereby determining the identity of the user. For example, the facial features of the user may be compared to a set of facial features stored in a database of facial features associated with each of the residents in a secure facility.

FIG. 3 is a schematic block diagram illustrating one embodiment of a processing device configurable for use according to the present embodiments. In various embodiments, system 300 may be a server, a workstation, a kiosk, a smart terminal, a desktop computer, a laptop, a tablet computer, a mobile device, a smart phone, or the like. In some cases, system 300 may be used to implement visitation system 130.

As illustrated, computer system 300 includes one or more processors 310A-N coupled to a system memory 320 via an input/output (I/O) interface 330. Computer system 300 further includes a network interface 340 coupled to I/O interface 330, and one or more input/output devices 350, such as cursor control device 360, keyboard 370, display(s) 380, or mobile device(s) 390. Other devices may include, for example, surveillance cameras, microphones, antennas/wireless transducers, phone detection modules, etc. In some embodiments, each of visitation system 130, AMS 116, communication processing system 101, devices 102-104, and/or devices 105, 106, 109, 112, and 113 may be implemented using a single instance of computer system 300, while in other embodiments multiple such systems, or multiple nodes making up computer system 300, may be configured to host different portions of a given electronic device or system.

In various embodiments, computer system 300 may be a single-processor system including one processor 310, or a multi-processor system including two or more processors 310 (e.g., two, four, eight, or another suitable number). Processors 310 may be any processor capable of executing program instructions. For example, in various embodiments, processors 310 may be general-purpose or embedded processors implementing any of a variety of instruction set architectures (ISAs), such as the x86, PowerPC®, ARM®, SPARC®, or MIPS® ISAs, or any other suitable ISA. In multi-processor systems, each of processors 310 may commonly, but not necessarily, implement the same ISA. Also, in some embodiments, at least one processor 310 may be a graphics processing unit (GPU) or other dedicated graphics-rendering device.

System memory 320 may be configured to store program instructions and/or data accessible by processor 310. In various embodiments, system memory 320 may be implemented using any suitable memory technology, such as static random access memory (SRAM), synchronous dynamic RAM (SDRAM), nonvolatile/Flash-type memory, or any other type of memory. As illustrated, program instructions and data implementing certain operations such as, for example, those described below in connection with FIGS. 4-8, may be stored within system memory 320 as program instructions 325 and data storage 335, respectively. In other embodiments, program instructions and/or data may be received, sent or stored upon different types of computer-accessible media or on similar media separate from system memory 320 or computer system 300.

Generally speaking, a computer-accessible medium may include any tangible or non-transitory storage media or memory media such as electronic, magnetic, or optical media—e.g., disk or CD/DVD-ROM coupled to computer system 300 via I/O interface 330. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

In an embodiment, I/O interface 330 may be configured to coordinate I/O traffic between processor 310, system memory 320, and any peripheral devices in the device, including network interface 340 or other peripheral interfaces, such as input/output devices 350. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. In addition, in some embodiments some or all of the functionality of I/O interface 330, such as an interface to system memory 320, may be incorporated directly into processor 310.

Network interface 340 may be configured to allow data to be exchanged between computer system 300 and other devices attached to a network, such as other computer systems, or between nodes of computer system 300. In various embodiments, network interface 340 may support communication via wired or wireless general data networks, such as any suitable type of Ethernet network, for example; via telecommunications/telephony networks such as analog voice networks or digital fiber communications networks; via storage area networks such as Fibre-Channel SANs, or via any other suitable type of network and/or protocol.

Input/output devices 350 may, in some embodiments, include one or more display terminals, keyboards, keypads, touchpads, scanning devices, voice or optical recognition devices, mobile devices, or any other devices suitable for entering or retrieving data by one or more computer system 300. Multiple input/output devices 350 may be present in computer system 300 or may be distributed on various nodes of computer system 300. In some embodiments, similar input/output devices may be separate from computer system 300 and may interact with one or more nodes of computer system 300 through a wired or wireless connection, such as over network interface 340.

As shown in FIG. 3, memory 320 may include program instructions 325, configured to implement certain embodiments described herein, and data storage 335, comprising various data which may be accessible by program instructions 325. In an embodiment, program instructions 325 may include software elements of embodiments illustrated in the above figures. For example, program instructions 325 may be implemented in various embodiments using any desired programming language, scripting language, or combination of programming languages and/or scripting languages (e.g., C, C++, C#, Java™, JavaScript™, Perl, etc.). Data storage 335 may include data that may be used in these embodiments (e.g., recorded communications, profiles for different modes of operations, etc.). In other embodiments, other or different software elements and data may be included.

A person of ordinary skill in the art will appreciate that computer system 300 is merely illustrative and is not intended to limit the scope of the disclosure described herein. In particular, the computer system and devices may include any combination of hardware or software that can perform the indicated operations. In addition, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

FIG. 4 is a schematic flowchart diagram illustrating one embodiment of a method 400 for verifying inmate presence during a facility transaction. In one embodiment, the receiver module 401 may receive login information to initiate a user session at an interactive data terminal. For example, the receiver module 201 may receive login information from input/output devices 350, over I/O interface 330 of smart terminal 103a. The presence tracker 202 may then generate 402 user presence information to track the presence of the user at the interactive data terminal. If the presence tracker 202 determines 406 that the user has left the interactive data terminal, the session terminator 203 may automatically terminate 404 the user session.

FIG. 5 illustrates another embodiment of a method 500 for verifying inmate presence during a facility transaction. The method 500 of FIG. 5 is configured for use with touch-sensitive device 204. In one embodiment, the method 500 starts by designating 501 an area of the touch sensitive device 204 for the user to continuously contact. As used herein, the term "continuously contact" may include contact with brief interruptions within a predetermined threshold. For example, if the user loses contact with the touch-sensitive device 204 for less than one second, or less than two seconds, or less than another predetermined threshold of time, this may still be considered "continuous contact" by the presence tracker 202.

The presence tracker 202 may then monitor 502 for the user to initiate contact with the area. For example, the presence tracker 502 may monitor I/O interface 330 coupled to touch-sensitive device 204 to determine 503 when the user initiates contact with touch-sensitive device 204. The presence tracker 202 may then continue to monitor I/O interface 430 to track 504 user contact with the area and determine 505 whether the user has terminated contact with the area. Once the presence tracker 202 determines 505 that the user has terminated contact with the area, the session terminator 203 may then automatically terminate the user session.

FIG. 6 is a mockup diagram illustrating one embodiment of an apparatus for verifying inmate presence during a facility transaction during use. In one embodiment, the apparatus is a smart terminal 103. When an inmate is logged into an application deemed worthy of this level of protection, a "spot" 601 is presented on the touchscreen to which the inmate must maintain contact. Once the monitoring application detects that the spot 601 of the touchscreen is no longer being touched, the existing login session and display information are closed.

The inmate is required to touch a defined spot 601 on the touchscreen either before or after logging into select functions. While logged into one or more select functions, inmate must maintain contact with the defined spot 601.

In another embodiment, the entire touchscreen 204 may be inclusive in the defined spot; in which case, the inmate must always remain in contact with at least some portion of the touchscreen. In still another embodiment, the inmate is allowed to "drag" the spot 601 with his/her finger so as to continue to use other fingers to then select other portions 602 of the touchscreen all with one hand. In this variant, as long as the inmate remains in contact with the spot 601, the spot 601 will move to always be centered on the location indicated by the touch.

Secondary touches 602 of the touchscreen 204 by the inmate would be used as input to the application(s) being accessed by the user. For example, the inmate might with their left forefinger, maintain contact with the spot 601 and with their right forefinger interact with functions provided through the touchscreen display. Once the controlling application no longer detects that the spot 601 is being touched, then the inmate shall be forcibly logged out from the select function(s).

In another embodiment a warning message and a short timer to allow the inmate to reconnect with the spot 601 may be used. Optional behavior also includes obscuring or otherwise hiding sensitive information and not accepting touchscreen inputs to the select function(s) until the inmate reconnects with the spot 601 or the short time expires. Upon expiration of the short timer, the controlling application may forcibly log the inmate out from the select function(s).

FIG. 7 is a schematic flowchart diagram illustrating another embodiment of a method 700 for verifying inmate presence during a facility transaction. The embodiment of FIG. 7 may be used with image capture device 205. In one embodiment, the receiver 201 may initialize 701 image capture device 205 by accessing I/O interface 330 to receive images from image capture device 205. Image capture device 205 may then capture 702 images or video frames. Presence tracker 202 may determine 703 whether the images include one or more facial features. If so, presence tracker 202 may track 704 the facial features in the images or video frames. Presence tracker 202 may then determine 705 whether any facial features have been removed from the image(s). If presence tracker 202 determines 705 that the facial features have been removed from the image(s), then the session terminator 203 may terminate the user's session.

FIG. 8 is a mockup diagram illustrating another embodiment of an apparatus for verifying inmate presence during a facility transaction during use. This embodiment may also further demonstrate the method 700 described in FIG. 7. In this embodiment, the method 700 is carried out by a monitoring application as defined by the modules 201-203 of FIG. 2 operating on smart terminal 103. When an inmate is logged into an application deemed worthy of this level of protection, the monitoring application activates the webcam 205 and requires that the inmate show their face 801. During the use of the protected session, the monitoring application monitors the webcam 801 to ensure that a face 801 is still presented. If the monitoring application no longer detects a face 801, the existing login session and display information are closed.

This solution may utilizes the integrated webcam 205 of an inmate smart terminal 103 and utilizes algorithms for detecting facial features to verify that a human face is presented to the camera 205. In such an embodiment, facial detection may be required before and after logging into select functions. While logged into one or more select functions, the inmate may maintain their face 801 within the view of the webcam 205.

Once the controlling application 201-203 no longer detects a face 801 within view of the webcam 205, then the inmate may be forcibly logged out from the select function(s).

In an alternative embodiment, the session terminator 203 may present a warning message and a short timer to allow the inmate to replace their face within view of the webcam. Optional behavior also includes obscuring or otherwise hiding sensitive information and not accepting inmate inputs to the select function(s) until the inmate represents their face before the webcam. Upon expiration of the short timer, the controlling application shall forcibly log the inmate out from the select function(s).

In a further embodiment, a small window may be presented, into which is displayed the image being captured by the webcam to assist the inmate in properly placing their face in view of the webcam.

In still a further embodiment, facial identification processes may be performed. Within this variation, not only is facial detection required but the face must be matched against a known likeness of the inmate. A match to the known face of the inmate then acts not only as a means of maintaining the logged in session with the selected functions but also as an additional level of confirmation of the inmate's identity so as to preclude stolen logins from being used.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method comprising:

designating an area of a touchscreen of a controlled-environment facility interactive data terminal for a controlled-environment facility resident user to continuously contact;

receiving input information entered by a controlled-environment facility resident user to initiate a secure controlled-environment facility resident user session at the controlled-environment facility interactive data terminal;

sensing the controlled-environment facility resident contacting the area of the touchscreen designated for the resident user to continuously contact to generate user presence information to track continual presence of a controlled-environment facility resident at the controlled-environment facility interactive data terminal;

enabling input to areas of the touchscreen other than the designated area;

enabling movement of the area of the touch screen designated for the resident user to continuously contact by the user dragging the designated area on the touchscreen while maintaining continuous contact;

determining that the controlled-environment facility resident has left the controlled-environment facility interactive data terminal in response to the presence information; and automatically terminating the secure controlled-environment facility resident user session in response to a determination that the controlled-environment facility resident has left the controlled-environment facility interactive data terminal, maintaining security of the secure controlled-environment facility resident user session.

2. The method of claim 1, wherein designating the area of the touch-sensitive device further comprises generating a graphic on a touch-screen device for designating the area of the touch screen for the controlled-environment facility resident to contact.

3. The method of claim 1, wherein the area of a touch-sensitive device further comprises an entire screen of a touch-screen device.

4. The method of claim 1, wherein generating the user presence information further comprises:
  capturing an image including one or more facial features;
  determining that the image includes the one or more facial features; and
  detecting that the one or more facial features have been removed from the image.

5. The method of claim 1, wherein the input information comprises login credentials.

6. The method of claim 1, further comprising generating a warning in response to a determination that the controlled-environment facility resident has left the interactive data terminal, that the secure controlled-environment facility resident user session will automatically terminate unless the controlled-environment facility resident responds to the warning.

7. A controlled-environment facility interactive data terminal apparatus comprising:
  a touchscreen;
  a processing device configured to:
    receive input information input by a controlled-environment facility resident user to initiate a secure controlled-environment facility resident user session at the controlled-environment facility interactive data terminal;
    designate an area of the touchscreen for the controlled-environment facility resident user to continuously contact;
    sense the controlled-environment facility resident user contacting the area of the touchscreen designated for the resident user to continuously contact to generate user presence information to track continual presence of the controlled-environment facility resident at the controlled-environment facility interactive data terminal;
    enable input to areas of the touchscreen other than the designated area;
    enable movement of the area of the touch screen designated for the resident user to continuously contact by the user dragging the designated area on the touchscreen while maintaining continuous contact;
    determine that the controlled-environment facility resident has left the controlled-environment facility interactive data terminal in response to the presence information; and
    automatically terminate the secure controlled-environment facility resident user session in response to a determination that the controlled-environment facility resident has left the interactive data terminal, securing the input information.

8. The apparatus of claim 7, wherein the data processing device is further configured to sense the controlled-environment facility resident initiating and maintaining contact with the area designated for the resident user to continuously contact, and sense the controlled-environment facility resident terminating contact with the area designated for the resident user to continuously contact, to generate user presence information.

9. The apparatus of claim 7, wherein the data processing device is further configured to generate a graphic on the touchscreen for designating the area of the touchscreen for the controlled-environment facility resident to continuously contact.

10. The apparatus of claim 7, wherein the area of the touchscreen for the controlled-environment facility resident to continuously contact comprises an entire screen of the touchscreen.

11. The apparatus of claim 7, further comprising an image capture device coupled to the data processing device.

12. The apparatus of claim 11, wherein the image capture device is configured to capture an image including one or more facial features.

13. The apparatus of claim 12, wherein the data processing device is further configured to:
  determine that the image includes the one or more facial features; and
  detect that the one or more facial features have been removed from the image.

14. The apparatus of claim 7, wherein the input information comprises login credentials.

15. The apparatus of claim 7, further configured to generate a warning in response to a determination that the controlled-environment facility resident has left the interactive data terminal, that the secure controlled-environment facility resident user session will automatically terminate unless the secure controlled-environment facility resident responds to the warning.

16. A non-transitory computer-readable medium comprising computer readable instructions that, when executed by a processing device, cause the processing device to perform operations comprising:
  designating an area of a touchscreen of a controlled-environment facility interactive data terminal for a controlled-environment facility resident user to continuously contact;
  receiving input information from the controlled-environment facility resident user to initiate a secure controlled-environment facility resident user session at the controlled-environment facility interactive data terminal;
  sensing the controlled-environment facility resident contacting the area of the touchscreen designated for the resident user to continuously contact to generate user presence information to track continual presence of the controlled-environment facility resident at the controlled-environment facility interactive data terminal;
  enabling input to areas of the touchscreen other than the designated area;

enabling movement of the area of the touch screen designated for the resident user to continuously contact by the user dragging the designated area on the touchscreen while maintaining continuous contact;

determining that the controlled-environment facility resident has left the controlled-environment facility interactive data terminal in response to the presence information; and automatically terminating the secure controlled-environment facility resident user session in response to a determination that the controlled-environment facility resident has left the controlled-environment facility interactive data terminal, securing the input information.

17. The non-transitory computer-readable medium of claim 16, wherein generating the user presence information comprises:

sensing the controlled-environment facility resident initiating and maintaining contact with the area designated for the resident user to continuously contact; and sensing the controlled-environment facility resident terminating contact with the area designated for the resident user to continuously contact.

18. The non-transitory computer-readable medium of claim 17, wherein the area of a touch-sensitive device further comprises an entire screen of the touchscreen.

19. The non-transitory computer-readable medium of claim 16, wherein designating the area of the touchscreen further comprises generating a graphic on the touchscreen for designating the area of the touchscreen for the controlled-environment facility resident to contact.

20. The non-transitory computer-readable medium of claim 16, wherein generating the user presence information further comprises:

capturing an image including one or more facial features;

determining that the image includes the one or more facial features; and detecting that the one or more facial features have been removed from the image.

21. The non-transitory computer-readable medium of claim 16, wherein the input information comprises login credentials.

22. The non-transitory computer-readable medium of claim 16, wherein the operations further comprise generating a warning, in response to a determination that the controlled-environment facility resident has left the controlled-environment facility interactive data terminal, that the secure controlled-environment facility resident user session will automatically terminate unless the controlled-environment facility resident responds to the warning.

23. A system comprising:

a touch-screen device;

an image capture device configured to capture an image including one or more facial features; and a processing device coupled to the touch-screen device and to the image capture device, the processing device configured to:

receive input information from the touch-screen device to initiate a secure controlled-environment facility resident user session at a controlled-environment facility interactive data terminal;

designate an area of the touchscreen for a controlled-environment facility resident user to continuously contact;

sense the controlled-environment facility resident user contacting the area of the touchscreen designated for the resident user to continuously contact to generate user presence information to track continual presence of the controlled-environment facility resident at the interactive data terminal;

enable input to areas of the touchscreen other than the designated area;

enable movement of the area of the touch screen designated for the resident user to continuously contact by the user dragging the designated area on the touchscreen while maintaining continuous contact;

determine that the controlled-environment facility resident has left the controlled-environment facility interactive data terminal in response to the presence information; and automatically terminate the secure controlled-environment facility resident user session in response to a determination that the controlled-environment facility resident has left the controlled-environment facility interactive data terminal, maintaining security of the secure controlled-environment facility resident user session.

24. The system of claim 23, wherein the data processing device is further configured to:

determine that the image includes the one or more facial features; and detect that the one or more facial features have been removed from the image.

25. The system of claim 23, further configured to generate a warning in response to a determination that the controlled-environment facility resident has left the controlled-environment facility interactive data terminal, that the secure controlled-environment facility resident user session will automatically terminate unless the controlled-environment facility resident responds to the warning.

* * * * *